(12) United States Patent
Weisbeck

(10) Patent No.: US 9,249,852 B2
(45) Date of Patent: Feb. 2, 2016

(54) VIBRATION DAMPING APPARATUS

(71) Applicant: ITT Manufacturing Enterprises LLC, Wilmington, DE (US)

(72) Inventor: Jeffrey N. Weisbeck, Orchard Park, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 13/712,395

(22) Filed: Dec. 12, 2012

(65) Prior Publication Data

US 2013/0105262 A1 May 2, 2013

Related U.S. Application Data

(63) Continuation-in-part of application No. 12/789,913, filed on May 28, 2010, now abandoned.

(51) Int. Cl.
*F16F 9/30* (2006.01)
*F16F 7/10* (2006.01)
*F16F 7/01* (2006.01)

(52) U.S. Cl.
CPC ... *F16F 7/10* (2013.01); *F16F 7/01* (2013.01); *F16F 9/30* (2013.01)

(58) Field of Classification Search
CPC .............. F16F 7/01; F16F 7/015; F16F 7/00; F16F 9/30; F16F 9/00
USPC ............. 188/378, 379, 268; 267/136, 140.11, 267/141, 152, 153, 292
See application file for complete search history.

(56) References Cited

U.S. PATENT DOCUMENTS

| | | | |
|---|---|---|---|
| 2,184,482 A | 12/1939 | Austin et al. | |
| 2,417,347 A | 3/1947 | Brown | |
| 3,388,772 A | 6/1968 | Marsh et al. | |
| 3,559,694 A | 2/1971 | Volberg | |
| 3,747,915 A | 7/1973 | Hall | |
| 4,272,572 A | 6/1981 | Netherly | |
| 4,706,788 A | 11/1987 | Inman et al. | |
| 4,913,410 A | 4/1990 | Marshall | |
| 5,098,098 A * | 3/1992 | Petralia | 273/73 R |
| 5,924,261 A | 7/1999 | Fricke | |
| 6,179,215 B1 | 1/2001 | Shea | |

(Continued)

FOREIGN PATENT DOCUMENTS

EP 0 771 992 A1 5/1997
EP 1 060 970 A1 12/2000

OTHER PUBLICATIONS

Salvino et al., Evaluation of Granular-Fill Damping in a Shock-Loaded Box Beam, Proceedings of the 69th Shock and Vibration Symposium, St. Paul, MN, Oct. 12-16, 1998. http://www.bu.edu/biorobotics/publications/98b_Svs_vibration.pdf.

(Continued)

*Primary Examiner* — Robert A Siconolfi
*Assistant Examiner* — Vu Q Nguyen
(74) *Attorney, Agent, or Firm* — Barclay Damon, LLP

(57) ABSTRACT

An apparatus and method for damping vibrations within a physical object that is subject to vibration. In one version, a highly flexible enclosure includes at least one interior cavity that is substantially filled with a damping material in which the flexible enclosure is wrapped and secured about the exterior of the physical object.

16 Claims, 6 Drawing Sheets

(56) References Cited

U.S. PATENT DOCUMENTS

| | | |
|---|---|---|
| 6,298,963 B1 | 10/2001 | Kim |
| 6,736,423 B2 * | 5/2004 | Simonian et al. ............. 280/731 |
| 6,991,077 B2 | 1/2006 | Maeno et al. |
| 7,300,032 B2 | 11/2007 | Williams et al. |
| 7,367,270 B2 | 5/2008 | Perry, Jr. |
| 2005/0194210 A1 | 9/2005 | Panossian |
| 2006/0086836 A1 | 4/2006 | Osborn |
| 2006/0144659 A1 | 7/2006 | Wang et al. |
| 2007/0048445 A1 | 3/2007 | DiMario |
| 2007/0048504 A1 | 3/2007 | DiMario |
| 2007/0227814 A1 | 10/2007 | Schabel, Jr. |
| 2008/0029337 A1 | 2/2008 | Alston |
| 2009/0184200 A1 | 7/2009 | Lin et al. |
| 2009/0185897 A1 * | 7/2009 | Battig et al. .................. 415/119 |
| 2011/0290606 A1 | 12/2011 | Weisbeck |

OTHER PUBLICATIONS

International Search Report/Written Opinion for PCT/US2013/073221; dated Mar. 7, 2014 (9 pages).

* cited by examiner

VIBRATION DAMPING APPARATUS

CROSS REFERENCE TO RELATED APPLICATIONS

This application is a continuation in part application under 35 U.S.C. §120 based upon U.S. application Ser. No. 12/789,913, filed May 28, 2010, and entitled Vibration Damping Apparatus, the entire contents of which are herein incorporated by reference.

TECHNICAL FIELD

This invention generally relates to an apparatus and method for damping physical objects that are subject to vibratory loads. According to one specific version, a highly flexible enclosure is substantially filled with damping materials, provided or produced in particle form, and secured in overlaying fashion about a physical object and in which the enclosure is configured for securement about physical objects having various shapes and sizes.

BACKGROUND

Certain physical objects may encounter different forms of vibrational loading in the course of their use. By way of example, a railroad car running board is used to define a narrow walkway along either a side or a roof of a railway car. Typically, running boards are made from steel and mounted to a railroad car via brackets at various attachment points using threaded fasteners or other suitable means.

As would be expected in the course of typical use, the running boards typically wear out, usually failing at one or more attachment points between the running board and the brackets and usually as a result of damage caused by vibrational loads that are transferred from the railroad car to the running board via the mounting brackets. These vibrational loads excite the fundamental natural frequencies of the running boards, thereby resulting in increased stress. It can be imagined that other physical objects having similar mounting schemes can be subject to similar wear and failure modes in the course of use/operation.

SUMMARY

This invention relates to an apparatus as well as a related method for damping vibrations within a physical object that is subject to vibrational loads. According to one aspect, an enclosure is substantially filled with a damping material made or otherwise produced in particle form, the enclosure being directly and fixedly attached to the physical object. In one version, the enclosure is fabricated from a flexible material and includes means for releasably attaching the enclosure to the physical object. According to one embodiment, the releasable attaching means includes a series of engagement members formed along a linear section that binds the enclosure in a closed configuration. In another version, the engagement members can be formed as a zipper or be configured with a similar structure. In general, the releasable attaching means enables the enclosure between an open and a closed configuration.

According to at least one version, the physical object is a railroad car running board, and the damping material is a granular visco-elastic material such as granulated tire rubber in which the enclosure is secured to the underside of the running board by means of an attachment frame or similar structure that is attached to opposing sides of the enclosure. In the course of the design of the enclosure, however, it will be readily apparent to one of sufficient skill that various visco-elastic materials, including granulated polymer based materials, also can suitably damp a railcar running board or other type of physical object to which the enclosure is attached.

According to another version, an enclosure is defined by a cylindrical enclosure that retains particles of a visco-elastic damping material within an interior cavity. The enclosure is attached at opposing ends to bracketry that is further connected mechanically to the underside of a railroad running board. The bracketry can be attached to end caps attached to the enclosure in which one set of fasteners directly secure one end of each bracket to the end of the enclosure. A second end of each bracket is configured to retain fasteners that secure the bracket to the underside of the railroad running board. In one version, the fasteners are mounted symmetrically about a center portion of the bracket end to the enclosure.

In yet another version, a flexible enclosure is utilized for damping purposes. The flexible enclosure comprises a pair of planar sheets that are bonded together and define at least one interior cavity that is at least partially filled with a damping material, such as a granulated elastomer. The enclosure can be fitted about an object and wherein a pair of adjacent edges of the flexible enclosure can be matingly secured. According to one version, attachment members are provided along the periphery of each adjacent edge.

According to another aspect, there is provided a method for damping vibrations within a physical object, wherein the method comprises the steps of providing an enclosure and substantially filling the enclosure with a damping material and in which the enclosure is then fixedly attached to the physical object.

According to one version of the herein described method, the enclosure is defined by a flexible member having an interior sealed cavity that retains a quantity of a damping material provided or produced in a particle form. The defined enclosure includes a first internal edge and a parallel second internal edge, as well as attachment members provided on each of the internal edges enabling the enclosure to assume an open and a closed configuration. In one embodiment, the first internal edge includes a set of engagement members that are engageable with a corresponding set of engagement members formed on the second internal edge of the enclosure. The enclosure is made from a flexible material and is at least partially filled with a damping material, such as a granulated elastomer, in which the enclosure can be wrapped about the physical object and secured.

An advantage is that a plurality of physical objects can be damped, including those having curved or intricate shapes or configurations using at least one of the enclosures described herein.

Another advantage is that the enclosure can be releasably attached to the physical object being damped, which permits the enclosure to be selectively removed.

These and other features and advantages will be readily apparent from the following Detailed Description, which should be read in conjunction with the accompanying drawings.

BRIEF DESCRIPTION OF THE DRAWINGS

The objects and features described in this application can be better understood with reference to the claims and drawings described below. The drawings are not necessarily to scale, and the emphasis is instead generally being placed upon illustrating the tenets of the disclosure.

DETAILED DESCRIPTION

Certain exemplary embodiments of a vibration damping apparatus and related method of using the damping apparatus are herein provided. It will be readily apparent, however, that a number of modifications and variations are possible to those of sufficient skill in the field. In addition, certain terms are used throughout the description to provide a suitable frame of reference with regard to the accompanying drawings. These terms are not intended to overly limit the scope of the invention, including the claims, unless expressly indicated.

Figure 1:
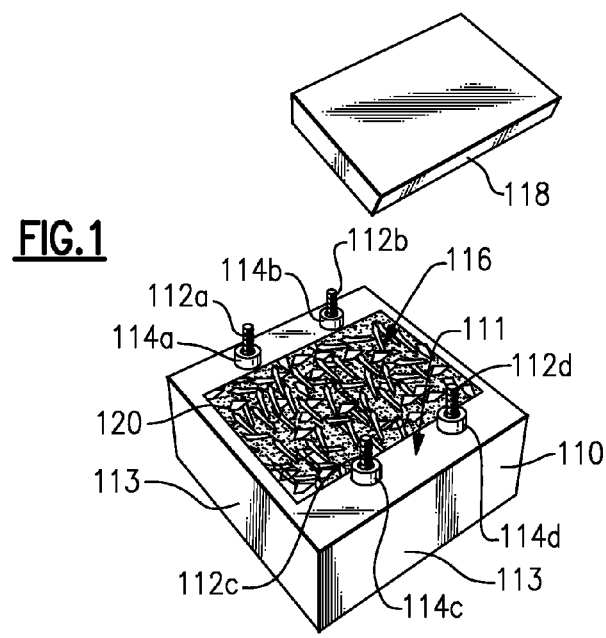
FIG. 1 illustrates a top perspective view of an enclosure that is substantially filled with visco-elastic material, in accordance with an exemplary embodiment of the invention.

FIG. 1 illustrates a first exemplary embodiment of a vibrational damping apparatus. This apparatus, herein labeled by reference numeral 100, comprises an enclosure 110 that is substantially filled with a volume of granulated visco-elastic material 120 (also referred to synonymously as "visco-elastic material"). According to this embodiment, the enclosure 110 is defined by a substantially cubic configuration that is further defined by a bottom surface (not shown) as well as a plurality of lateral side surfaces 113 (not all shown in FIG. 1) in which the enclosure 110 is preferably made from a metal alloy, such as sheet metal. In other embodiments, the enclosure 110 can alternately be made from wood, plastic and/or other type of material that can suitably enclose the visco-elastic material and prevent migration of moisture into the confines of the enclosure 110. The bottom and side surfaces 113 are non-porous and designed to retain the visco-elastic material 120 within the confines of the enclosure 110.

As shown, the enclosure 110 includes a singular interior cavity 116 extending into the enclosure through an opening in a top surface 111 within which the volume of granulated visco-elastic material 120 is retained. In other embodiments, the enclosure 110 can include multiple cavities that can each be employed to store visco-elastic material. Optionally, a cap or cover 118 can be attached to the top surface 111 to entirely seal the opening and enclosure 110 in order to prevent leakage of the visco-elastic material from the confines of the enclosure 110. More particularly and according to this embodiment, the cap 118 is designed to be positioned and friction fitted (wedged) into the top opening of the interior cavity 116. The cap 118 functions as a plug to seal the interior cavity 116.

As noted, the interior cavity 116 of the enclosure 110 is substantially filled with the granulated visco-elastic material 120. Note that being "substantially filled" as intended herein does not require the interior cavity 116 to be entirely filled (e.g., packed) with visco-elastic material, in order to provide a benefit of substantial vibrational dampening. For example, filling the interior cavity 116 with visco-elastic material to at least about 75% of its maximum packed capacity, will provide substantial vibrational damping. According to this described embodiment, the entire enclosure 110, which is synonymously referred to hereinafter as a damping box, weighs approximately 1.7 pounds. The above parameters, including the shape of the enclosure 110, can be suitably altered depending for example on the physical object and its intended use.

In this exemplary embodiment, the enclosure 110 includes a means for fixedly attaching the enclosure to a physical object, such as a railcar running board (also referred to throughout this application as "a running board", or "railroad running board"). According to this exemplary embodiment, a set of four (4) threaded fasteners 112a-112d are disposed in relation to the interior cavity 116 of the enclosure 110 and provided on the top surface 111. According to this embodiment, one pair of threaded fasteners 112a, 112b are disposed along one side of the opening of the enclosure 110 and another pair of threaded fasteners 112c, 112d are provided on an opposite side of the opening, the latter of which is substantially rectangular in shape according to this exemplary version.

Each of the threaded fasteners 112a-d according to this embodiment are threaded bolts that are oriented with the head of the bolt (not shown) disposed on the inner side of the top surface 111 and the shank position extending upwardly, as shown in FIG. 1. As shown, each threaded fastener 112a-112d is respectively and threadingly engaged to a nut component 114a-114d, securing the threaded fastener 112a-112d and the nut component 114a-114d to the enclosure 110. In the embodiment shown, the visco-elastic material 120 is granulated tire rubber 120 that can be seen through the top opening of the interior cavity 116.

According to this exemplary embodiment, the attachment mechanism is defined by the bolts 112a-112d including their nut counterparts 114a-d, which are designed to maintain direct physical contact between the enclosure 110 and the physical object (i.e., railcar running board) while the enclosure 110 is fixedly attached to the physical object. As for the exemplary embodiment shown, the specific physical dimensions of the enclosure 110 are 2.75 inches in height, 4.75 inches in width and 4.75 inches in depth. Alternatively, the enclosure 110 can be designed and manufactured separate from the fixedly attaching means, such as without the bolts for example, and/or be made from various other types of material and made of various shapes and sizes, providing that the visco-granulated material can be securely contained within the confines of the enclosure 110, and while the enclosure 110 is fixedly attached to the physical object.

Figure 2:
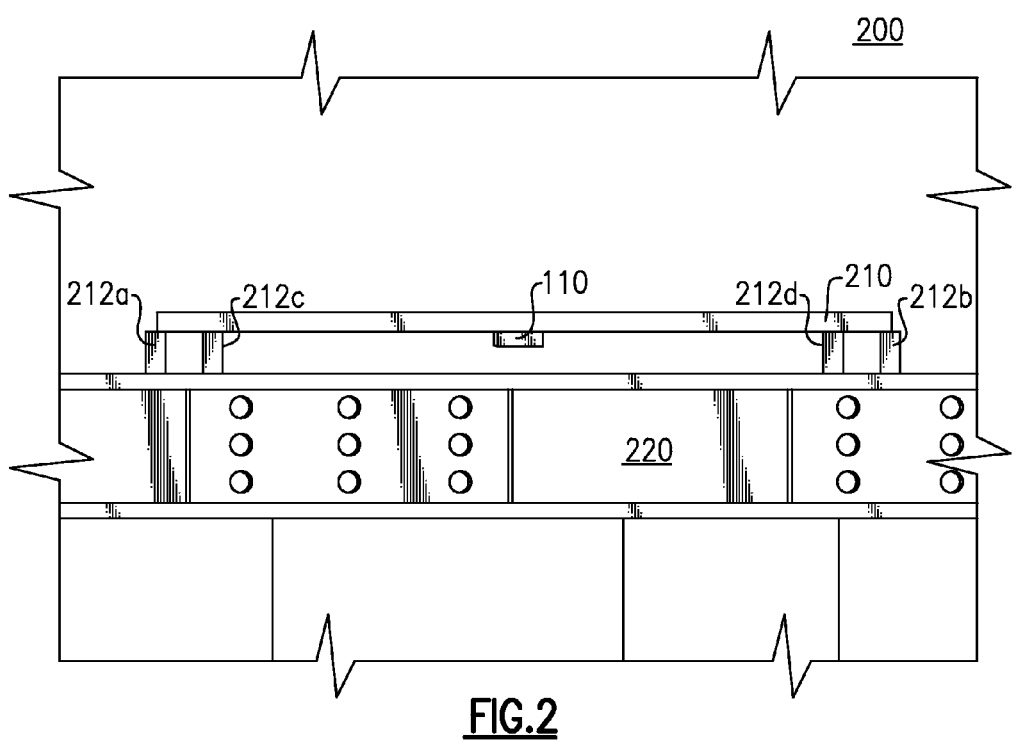
FIG. 2 illustrates a side elevational view of the enclosure of FIG. 1, as attached to a railroad running board mounted onto a vibration testing apparatus.

FIG. 2 illustrates a side elevational view of the enclosure 110 of FIG. 1 as attached to a railroad running board 210 that is mounted onto a vibration testing apparatus 200. As shown, the railroad running board 210 is fixedly mounted onto a support 220 of the vibration testing apparatus 200 via a set of four (4) mounting supports 212a-212d, which are disposed to engage each end corner of the running board 210.

The enclosure 110 is fixedly attached to the underside of the running board 210 via the attachment mechanism for enabling engagement between the threaded fasteners 112a-112d, each respective nut component 114a-114d, and the running board 210 itself. The running board 210 in this mounted position is disposed between the enclosure 110 and each nut component 114a-114d, (See FIG. 1), which is threadingly engaged to each threaded appendage 112a-112d, of the enclosure 110.

Note that the granulated visco-elastic material that is stored within the interior cavity 116 is not required to be in direct contact with the physical object. In accordance with the invention, the enclosure 110 is substantially filled with granulated visco-elastic material wherein the enclosure 110 is placed direct contact with the physical object while the enclosure 110 is fixedly attached to the physical object.

The vibration testing apparatus 200 is designed to transfer a spectrum of vibrational energy to the running board 210 via the mounting supports 212a-212d. The vibration testing apparatus 200 is also designed to measure the vibrational energy being transferred to the railroad running board 210 under test. Vibrational energy is transferred to the running board 210 via direct physical contact between each of (4) end corners of the running board 210 and a respective mounting support 212a-212d of the vibration testing apparatus 200. Each end corner of the running board 210 is bolted (not shown) to a respective mounting support 212a-212d of the vibration testing apparatus 200.

The mounting arrangement shown in FIG. 2 is an example of a typical mounting arrangement between the enclosure 110 of FIG. 1 and a running board 210. It should be readily apparent that other types of mounting arrangements can be employed. For example, and in other alternative mounting arrangements, a strap (not shown) could be employed to attach the enclosure 110, or another embodiment of the enclosure to the running board 210 or to another type of physical object for which vibration is to be dampened. Optionally, the threaded fasteners could instead be used to attach to another intermediate object, such as a strap engaging component (not shown), that acts as an accessory to the enclosure 110 and that facilitates attachment between the enclosure 110 and the strap (not shown).

Figure 3:
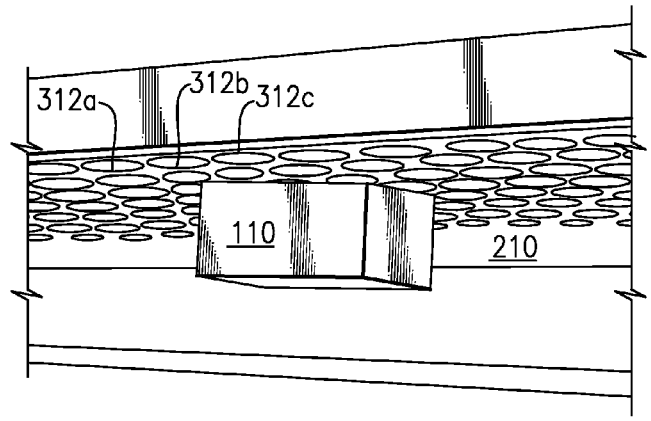
FIG. 3 illustrates a bottom perspective view of the enclosure of FIGS. 1 and 2, as attached to a railroad running board of FIG. 2.

FIG. 3 illustrates a perspective view of the enclosure 110 of FIGS. 1 and 2, as it is fixedly attached to the underside of the railroad running board 210 of FIG. 2 under test. As shown, the railroad running board 210 includes a grated rectangular panel that includes a plurality of holes 312a-312c passing through the thickness of the railroad running board 210. The running board 210 shown herein is dimensioned to be 71.5 inches in length and 26.5 inches in width although the foregoing dimensions are intended to be exemplary. Each of the threaded fasteners 112a-112d of the enclosure 110 are inserted upward and through a respective hole 312a-312c provided within the running board 210 while the nut component 114a-114d, FIG. 1, is threadingly engaged to each fastener 112a-112d from a upper side (not shown in this view) of the running board 210. In this embodiment, the plurality of holes 312a, 312b, 312c within the running board 210 enables a wide variety of locations to which the enclosure 110 can be attached to the running board 210.

Figure 4:
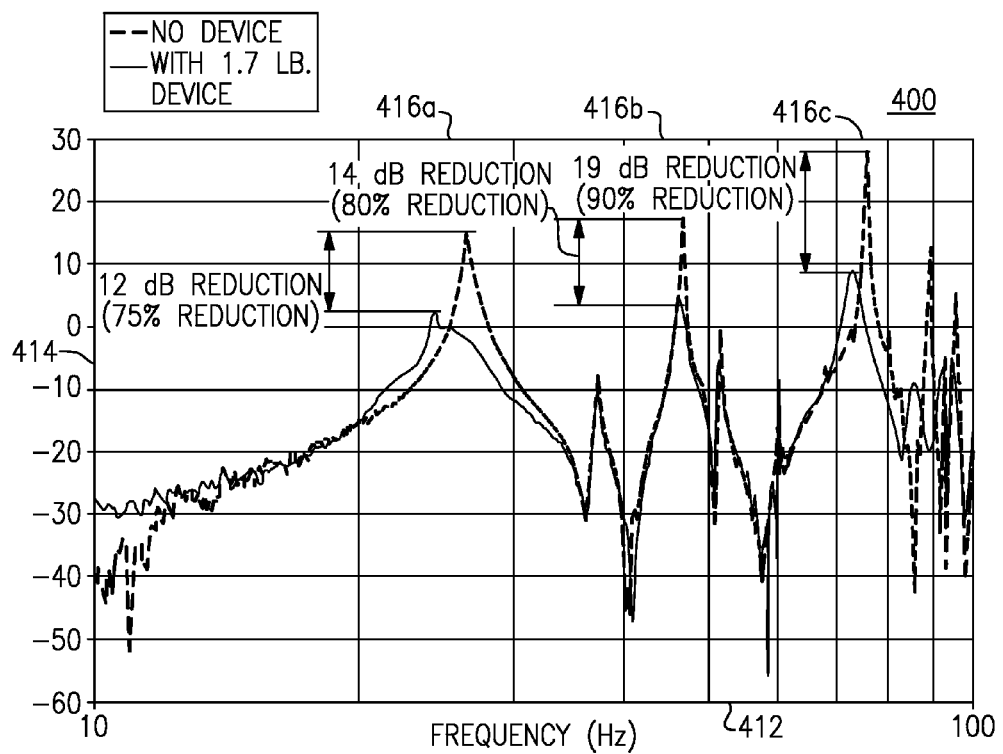
FIG. 4 illustrates a graph representing vibrational transfer to the railroad running board of FIG. 2 as a function of vibrational frequency, shown with the enclosure and without the enclosure for comparison.

FIG. 4 illustrates a graphical representation 400 of output from the vibrational testing apparatus 200 based upon the transfer of vibrational acceleration to the running board 210 of FIGS. 2-3 as a function of vibrational frequency of that vibrational acceleration. The vibration testing apparatus 200 transfers vibrational acceleration to the running board 210 via the mounting supports 212a-212d.

As shown, the graph 400 includes a horizontal axis 412 and a vertical axis 414. The horizontal axis 412 indicates values of vibrational frequency (hertz) of vibrational acceleration (decibels) being transferred to the running board 210. The vertical axis 414 indicates a vibrational acceleration difference as measured in decibels, between vibrational energy of a running board 210 with an attached enclosure 110 and vibrational energy of a running board 210 without an attached enclosure 110 (dashed line). Note that decibel measurements are relative to a reference value, labeled as "0" marked on the vertical axis 414. Each decibel value represents vibrational acceleration within the running board 210 that is measured relative to the reference value.

Still referring to FIG. 4, vibrational acceleration is correlated to vibrational frequency, where vibrational frequency is measured within a range of 10 to 100 Hertz. The highest amounts of vibrational energy reside within vibrational acceleration peaks, also referred to as resonant peaks, appear to be located at frequency values of about 25 Hertz, 45 Hertz and 75 hertz, as indicated by 416a, 416b, and 416c, respectively, on the graph 400. These peaks indicate an amplification of the vibrational energy within the running board 210 at these indicated frequencies 416a-416c.

As shown within this graph 400, the attachment of the vibrational damping apparatus 110 to the running board 210 causes a significant reduction of amplification of vibrational energy within the running board 210 at each of the indicated frequencies 416a-416c.

For example, this graph 400 indicates about a 75% reduction in vibrational energy within the running board 210 at about 25 Hertz, about an 80% reduction at about 45 Hertz and about a 90% reduction at about 75 Hertz. The running boards 210 on railroad cars are failing at attachment locations between the running board 210 and the railroad car due to vibration (excitation) of the running board 210 at resonant frequencies caused by transfer of vibrational energy from an operating railroad train car.

Advantageously, attachment of the vibrational damping apparatus 110 to a running board 210 substantially reduces these vibrational forces acting upon the running board at resonant frequencies, and as a result, reduces wear and tear of the running board 210 at the attachment locations to the railroad car and extends the useful life (longevity) of the running board 210, while it is attached to an operating railroad car.

Figure 5A:
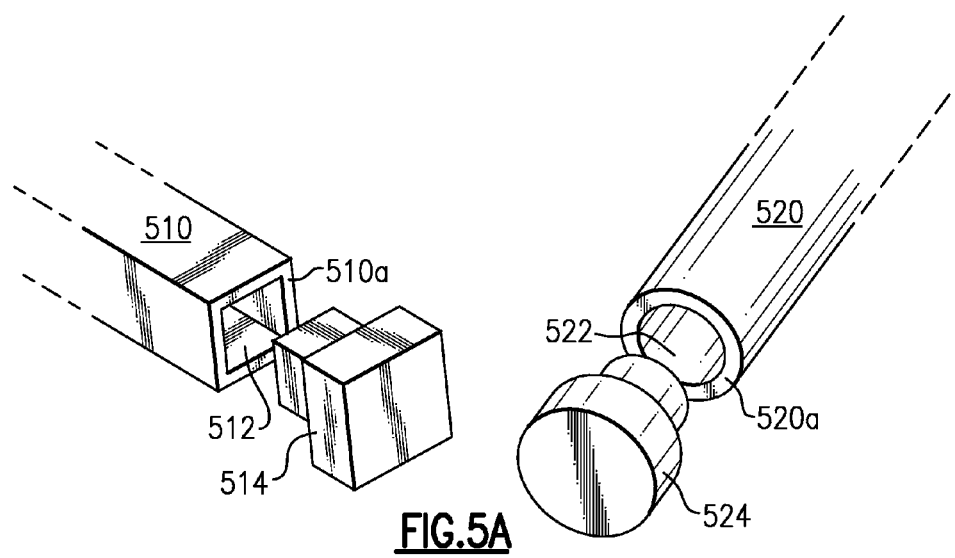
FIGS. 5A-5B illustrate various applications of the present invention in relation to at least one cavity located within a physical object.

FIG. 5A illustrates a further exemplary embodiment in which a physical object itself can be damped by forming at least one cavity (void) located within the physical object. As shown, a box beam 510 is provided having a hollow interior and defined by a square or rectangular shape. Other polygonal shapes, such as trapezoidal, pentagonal, as well as circular, are however contemplated herein for purposes of this embodiment wherein the box beam design is simply exemplary. For example and still referring to FIG. 5A, a cylindrical beam 520 is also a hollow type of structural beam but having a circular cross-section. An interior cavity 522 is similarly visible through an open end 520a. More specifically and according to the specific embodiment, the box beam 510 is hollow and defined by an interior cavity 512, also referred to herein as a void or voided cavity, which is visible through an open end 510a thereof.

Both the box beam 510 and the cylindrical beam 520 are each typically employed as structural members within other structures in order to provide strength and support against directed loads.

In order to dampen vibrations within the box beam 510, a volume of granulated visco-elastic material is disposed within the interior cavity 512 of the box beam 510. Likewise and in order to dampen vibrations within the cylindrical beam 520, a volume of granulated visco-elastic material is similarly disposed within the interior cavity 522 of the cylindrical beam 520.

Optionally, the visco-elastic material can be packed tightly into either cavity 512, 522, but such tight packing is not required to obtain substantial vibrational damping characteristics of the invention. For example, loosely filling either cavity 512, 522 with granulated visco-elastic material to about 75% of its maximum packed capacity, also provides substantial vibrational damping.

The granulated visco-elastic material is enclosed within either the box beam 510 or cylindrical beam 520 via at least one end cap 514, 524. The box beam 510 can be filled with visco-elastic material via its open end 510a. Upon filling, an end cap 514 is attached to the box beam 510 at its open end 510a to enclose the stored visco-elastic material. The end cap 514 is designed to function as a plug that is friction-fitted into the cavity 512. Likewise, the cylindrical beam 512 can be filled with visco-elastic material via its open end 520a. Upon filling, an end cap 524 can be attached to the cylindrical beam 520 at its open end 520a to enclose the stored visco-elastic material stored. The end cap 524 is designed to function as a plug that wedges into the cavity 522.

In some embodiments, the end cap 514, 524 is designed to surround and optionally snap around each open end 510a, 520a. In other embodiments, as shown, the end cap is designed like a plug to partially enter and seal each respective cavity 512, 522 that is accessible from each open end 510a, 520a of either the box beam 510 or the cylindrical beam 520. The aforementioned embodiments of the end cap are designed to act as to prevent leakage of visco-elastic material from leaking (escaping) from either of the box beam cavity 512 or from the cylindrical beam cavity 522.

Figure 5B:
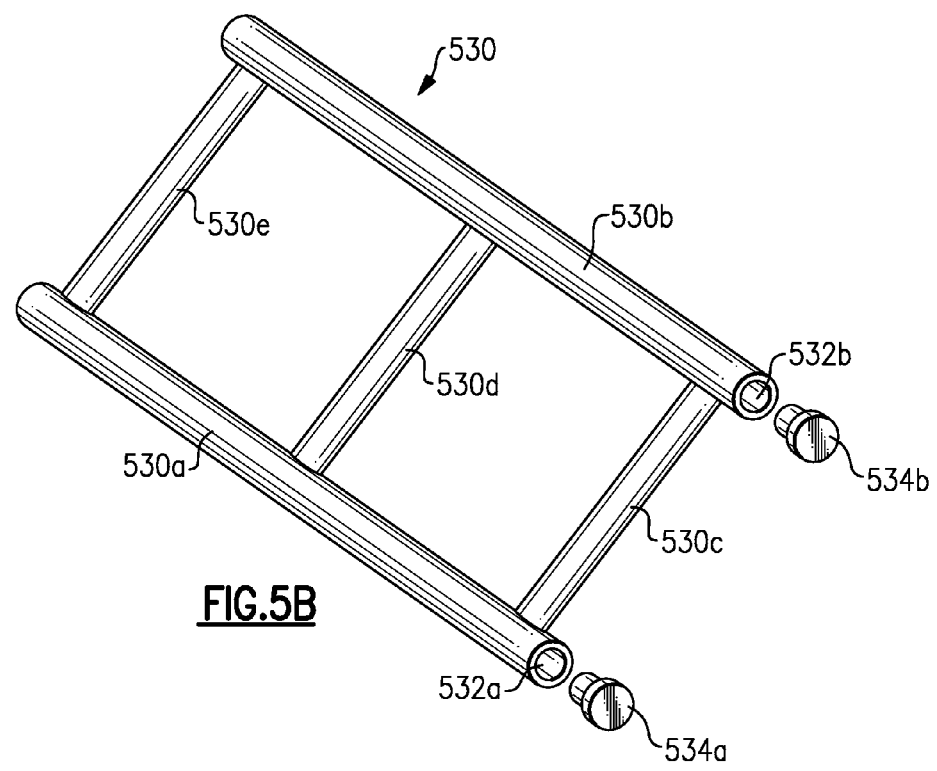

FIG. 5B illustrates a frame 530 that is constructed from an attachment of a plurality of hollow cylindrical beams 520 forming a frame-like (ladder-like) structure 530. In order to obtain vibrational damping characteristics of the invention, at least some or all of the cylindrical beams 530a-530e are substantially filled with granulated visco-elastic material within their respective cavities. As shown, cylindrical beams 530a and 530b are filled with visco-elastic material via their open ends 532a and 532b respectively. The visco-elastic material is enclosed within each respective hollow cylindrical beam 530a, 530b via end caps 534a and 534b respectively. The end caps 534a, 534b are designed to function as plugs that wedge into the cavities 532a and 532b, respectively.

In some embodiments of the invention, the frame 530 is constructed to constitute at least a portion of a running board. Optionally, a walking surface is layered and attached above the frame 530 to construct a railroad running board. Points of attachment of the running board can be created at locations on the frame 530 and/or on the walking surface (not shown). In other embodiments, the frame 530 can function as a frame or as scaffolding to support another type of surface, such as a wall or floor surface, or other structural component.

Figure 6:
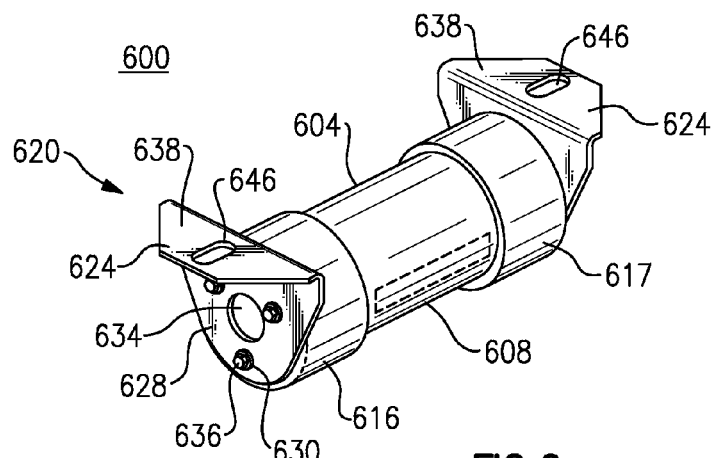
FIG. 6 is a perspective view of a vibration damping apparatus in accordance with another exemplary embodiment.
Figure 7:
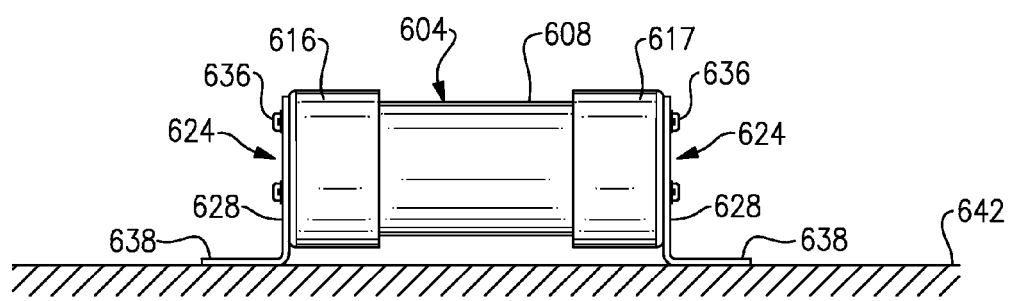
FIG. 7 is a side view of the vibration damping apparatus of FIG. 6.

With reference to FIGS. 6 and 7, another exemplary embodiment of a vibration damping apparatus is herein described. The damping apparatus 600 is defined herein by a hollow enclosure 604 and a frame 620 that supports the enclosure 604 and enables securement to a physical object 642. More specifically and according to this embodiment, the enclosure 604 is defined by a cylindrical beam-like structure including an exterior surface 608, as well as an interior cavity (not shown). Caps 616, 617 are provided on opposing ends of the cylindrical beam-like enclosure 604 to seal the contents of the interior cavity, which in this instance is substantially filled with a damping material. The damping material is formed or otherwise provided in particle form. For example, a granulated visco-elastic material, such as granulated tire rubber or combination of tire rubber and elastomeric material can be utilized. In this embodiment, the caps 616, 617 are defined as open-ended cylindrical members that are disposed over the exterior surface 608 at each end of the enclosure 604. Preferably, the enclosure 604 and the caps 616, 617 are each fabricated from a light weight, fluid impermeable material such as a moldable plastic material, although each could also alternatively be made from different materials, such as steel or aluminum.

The frame 620 according to this embodiment comprises a pair of angled end brackets 624. Each end bracket 624 is defined by a pair of substantially orthogonal supporting sections including a lateral mounting surface 628 that is attached to one of the ends of the hollow cylindrical enclosure 604 and a base mounting surface 638 that is secured to the physical object 642 being damped, the end brackets 624 each forming a substantially L-shaped configuration. More specifically, the lateral mounting surface 628 includes a plurality of mounting holes 630 symmetrically disposed circumferentially about a center opening 634, each of the mounting holes 630 being aligned with corresponding mounting holes (not shown) provided in the end caps 616, 617 to enable securement to the hollow enclosure 604. The base mounting surface 638 includes at least one slotted opening 646 sized to accommodate at least one fastener (not shown). The frame 620 described herein is intended to be exemplary. For example, the frame could consist of a unitary structure defined by a single base mounting side and a pair of lateral mounting surfaces. The presently described frame 620 provides additional versatility in terms of fitting enclosures of varying lengths. Other suitable configurations that adequately enable securement to each of the physical object 642 and the enclosure 604 could also be utilized.

In operation and still referring to FIGS. 6 and 7, one of the caps 616, 617 is attached to the enclosure 604 and a volume of visco-elastic material (not shown) is added to the interior cavity prior to attaching the remaining cap 617, 616. The lateral mounting surface 628 of each end bracket 624 is attached using fasteners 636 to secure the frame 620 to the ends of the enclosure 604 or alternatively the base mounting surface 638 can first be secured to the underside of the physical object 642 and then the enclosure 604 can be attached to the lateral mounting surface 628 of each end bracket 624. When mounted, the enclosure 604 is inboard of each of the base mounting surfaces 638 of the supporting frame 620 and not in direct contact with the physical object 342, such as, for example, the underside of a railcar running board, such as those previously described. Vibratory loads placed upon the physical object 342 are effectively damped by the hollow enclosure 604 and contained damping material.

Referring to FIGS. 8-13, there is provided a vibration damping apparatus in accordance with yet another exemplary embodiment can be fitted onto or over the exterior of a physical object for purposes of vibrational damping. According to this version, the vibration damping apparatus 700 comprises an enclosure 704 made from a flexible material that includes at least one interior cavity containing a quantity of damping material in particle form. More specifically, the enclosure 704 is defined by a flexible planar construction including a pair of sides 708, 712 disposed about a center axis or seam 715 that enable folding or wrapping of the enclosure about a physical object 750, FIG. 10.

Figure 8:
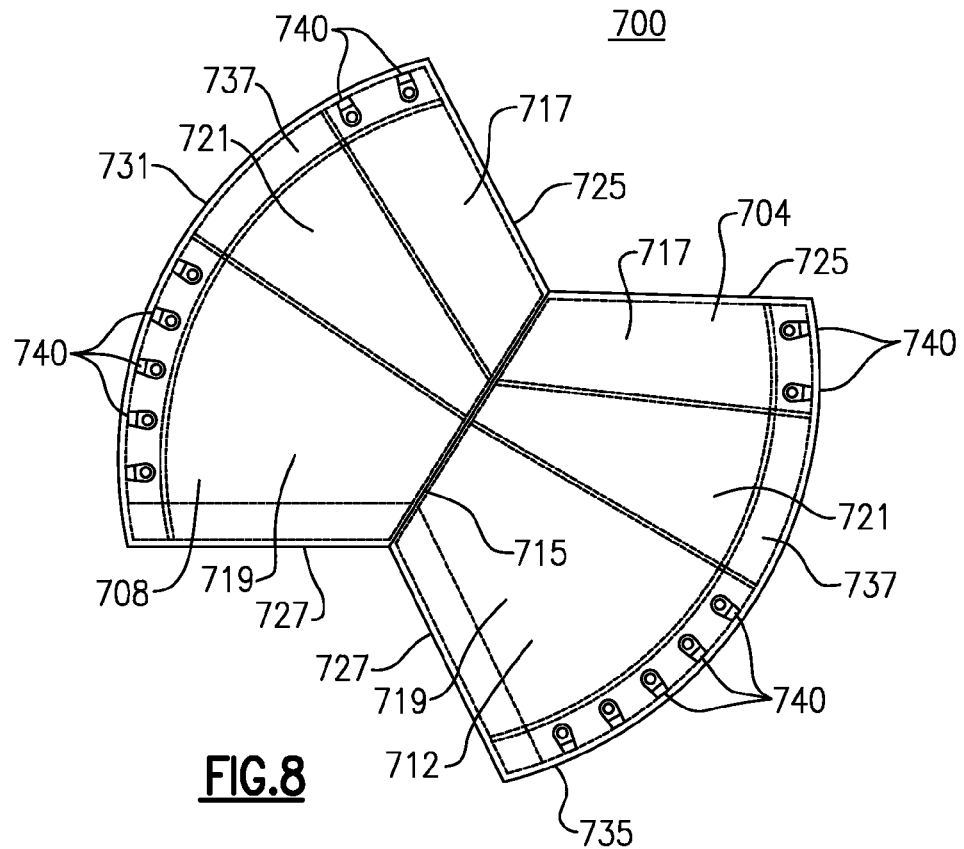
FIG. 8 is a top view of a vibration damping apparatus in accordance with another exemplary embodiment in a pre-installed or open condition.

According to this exemplary embodiment and referring specifically to FIG. 8, each side 708, 712 of the enclosure 704 is defined by a pair of sheets commonly made from a fluid impermeable material and disposed in overlaying relation, in which each of the sheets are secured to one another and with each side 708, 712 being secured to the other at the center seam 715. One suitable material suitable for use is Nomex, although other materials that enable wrapping, are fluid impermeable and enable sealing can be utilized. As described herein, the sheets of each side 708, 712 of the enclosure 704 are stitched together at respective edges and the sides are stitched to each other along the center seam 715. Alternatively, the sheets and sides 708, 712 can be sealed by means of heat staking, ultrasonic welding, or other suitable techniques.

At least one interior cavity is further provided in each side 708, 712 of the defined enclosure 704. According to this embodiment, a total of two (2) interior cavities 717, 719 are provided on each side 708, 712 and wherein the sides of the enclosure 704 form mirror images about the center seam 715. The interior cavities 717, 719 are each sealed according to this embodiment by means of stitching after each cavity has been filled with a suitable volume of damping material in particle form, such as a granulated elastomer, and in which an intermediate portion 721 on each side 708, 712 of the enclosure 704 between the defined interior cavities 717, 719 is not filled with damping material.

As assembled and still referring to FIG. 8, the enclosure according to this exemplary embodiment is defined by a "bow-tie" shape having a minimum width at the center seam 715 that tapers linearly along respective top and bottom sides 725, 727 of the enclosure 704 on each side 708, 712 thereof to a maximum at opposing outer edges 731, 735. The opposing outer edges 731, 735 of each side 708, 712 of the enclosure 704 are further defined by a curved (radial) contour.

Figure 9:
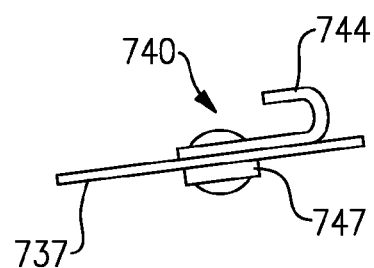
FIG. 9 is an enlarged view of an engagement member of the vibration damping apparatus of FIG. 8.

A plurality of engagement members 740 are anchored into the enclosure 704 at the outer edge 731, 735 of each side 708, 712 and more specifically adjacent each of the interior cavities 717, 719, the engagement members 740 being anchored within a border portion 737 adjacent each outer edge 731, 735 of the enclosure 704. More specifically and as shown in FIG. 9, the engagement members 740 according to this embodiment are defined by hooks 744 that are secured to anchors 747 attached to the border portion 737. The engagement members 740 are disposed in a circumferential manner following the radial contour of each outer edge 731, 735 and disposed with the hook 744 extends outwardly from the anchor 747 with a C-shaped engagement portion of each hook being reflexed inwardly toward the center axis 715.

Figure 10:
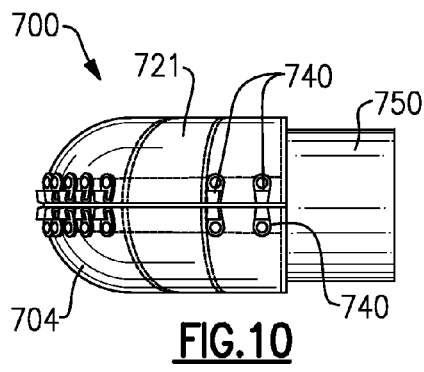
FIG. 10 is a top view of the vibration damping apparatus of FIG. 8 as attached to a physical object.
Figure 11:
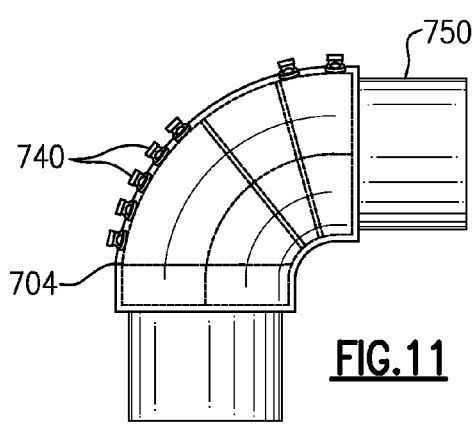
FIG. 11 is a side view of the assembled vibration damping apparatus of FIG. 10.
Figure 12:
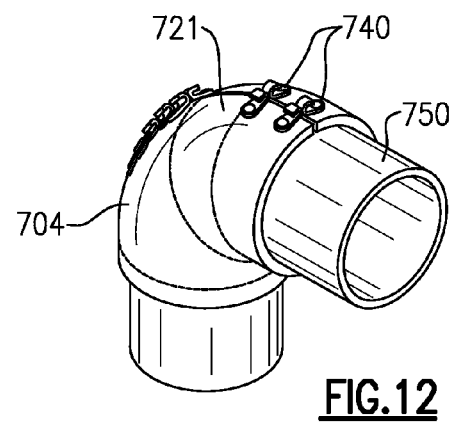
FIG. 12 is a top perspective view of the vibration damping apparatus of FIGS. 8-10, as assembled.
Figure 13:
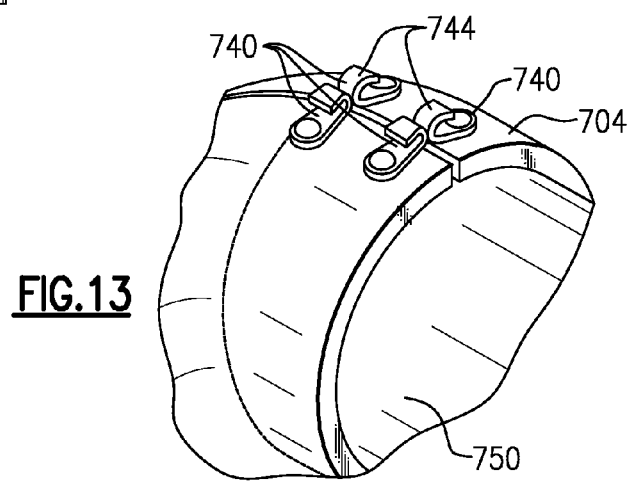
FIG. 13 is an enlarged view of a portion of the vibration damping apparatus of FIGS. 8-12.

The flexible enclosure 704 is then fitted in overlaying relation about the physical object 750 which, as shown in FIGS. 10-12 and according to the exemplary embodiment is a pipe elbow joint having an arcuate construction. In this exemplary embodiment, the flexible enclosure 704 is pulled over the curved exterior surface of the object 750 such that the curved outer edges 731, 735 are aligned and facing one another. To close and fixedly attach the enclosure 704 to the physical object 750, a section of lacing (not shown) is used to interlock the engagement members 740 by advancing ends of lacing through the hooks 744 in opposite sides in a repeatable manner.

As previously noted and according to this exemplary embodiment, intermediate portions 721 of the enclosure 704 are not filled with damping material or include engagement members 740 in order to accommodate an additional clamp (not shown) that is placed over the enclosure 704 following assembly to the pipe elbow joint. Depending on the application, however, all or the entirety of the volume of the enclosure 704 can be filled or substantially filled with damping material in particle form, such as granulated damping material, using a single interior cavity. It should also be apparent that the enclosure can assume numerous other forms in which sides and a center seam are not necessarily required. Alternatively, other attachment means can be provided. For example, a zipper-like structure could alternatively be provided in lieu of the engagement members 740 to releasably secure the enclosure once wrapped about the physical object of interest.

For purposes of this invention, "viscoelastic materials" refer to those materials for which the relationship between stress and strain depends on a duration of time of which a material is under stress. Examples of typical viscoelastic materials include amorphous polymers, semicrystalline polymers, biopolymers, metals at very high temperatures, and bitumen materials such as asphalt. Some polymers are classified as being elastomers that are considered rubberlike and capable of being stretched, such as synthetic rubber, while other polymers are classified as non-elastomers. For example, some gels, such as whey protein gels, are considered to be visco-elastic, but are not rubber like.

Embodiments of the invention employ damping material, such as, visco-elastic damping material that is capable of being produced in particle form, such as granular. Some visco-elastic damping material, such as granulated tire rubber, has a bulk specific gravity of less than 1.0, which is less dense than water. Other types of visco-elastic materials, however, such as asphalt, has a bulk specific gravity of greater than 1.0. Still other visco-elastic materials are defined by a mixture of polymer based and non-polymer based materials.

PARTS LIST FOR FIGS. 1-13

100 vibration damping apparatus
110 enclosure
111 top surface, enclosure
112*a* threaded fastener
112*b* threaded fastener
112*c* threaded fastener
112*d* threaded fastener
113 side surface, enclosure
114*a* nut
114*b* nut
114*c* nut
114*d* nut
116 interior cavity
118 cap or cover, enclosure
120 visco-elastic material
200 vibration testing apparatus
210 running board
212*a* mounting support
212*b* mounting support
212*c* mounting support
212*d* mounting support
220 support-testing apparatus
312*a* hole
312*b* hole
312*c* hole
400 graph
412 horizontal axis
414 vertical axis
416*a* frequency value 416b frequency value
416c frequency value
510 box beam
510a open end of box beam
512 voided cavity of box beam
514 box beam end cap
520 cylindrical beam
520a open end of cylindrical beam
522 voided cavity of cylindrical beam
524 cylindrical beam end cap
530 frame
532a open end of cylindrical beam
532b open end of cylindrical beam
534a end cap for cylindrical beam
534b end cap for cylindrical beam
600 vibration damping apparatus
604 enclosure
608 exterior surface
612 interior cavity
616 cap
617 cap
620 supporting frame
624 end brackets
628 lateral mounting surface
630 holes
634 center opening
636 fasteners
638 base mounting surface
642 physical object
646 slotted opening
700 vibration damping apparatus
704 enclosure
708 side, enclosure
712 side, enclosure
715 center axis or seam
717 interior cavity
719 interior cavity
721 intermediate portion
725 top edge
727 bottom edge
731 outer edge
735 outer edge
737 border portion
740 engagement members
744 hooks
747 anchor
750 physical object It will be readily apparent that other modifications and variations are possible within the intended ambits of the present invention, according to the following claims:

The invention claimed is:

1. An apparatus for damping vibrations within a physical object, said apparatus comprising:
a flexible enclosure substantially and loosely filled with a granulated damping material in particle form, said flexible enclosure being made from two bonded sheets of a fluid impermeable material that is configured to be entirely wrapped about the physical object, the flexible enclosure having a pair of opposing outer edges and a center seam that defines first and second sides of the enclosure, wherein the opposing outer edges are releasably secured to one another to retain said flexible enclosure onto said physical object when wrapped thereabout, and in which the flexible enclosure includes at least one interior cavity defined in each side, each said at least one interior cavity being bounded by the two bonded sheets, one of the outer edges and the center seam, wherein at least one interior cavity is substantially filled with the granulated damping material.

2. The apparatus of claim 1, wherein each of said opposing outer edges include a plurality of engagement members, each of said engagement members having hooks that are engageable by lacing to releasably secure said flexible enclosure after wrapping about the physical object.

3. The apparatus of claim 1 wherein each of said first and second sides of the enclosure are substantial mirror images that are separated from one another by the center seam, each side including at least two said interior cavities.

4. The apparatus of claim 1, wherein said damping material comprises a granulated elastomer.

5. The apparatus of claim 1, wherein each side of the flexible enclosure includes a pair of interior cavities separated by an intermediate cavity, wherein only the interior cavities contain the damping material.

6. The apparatus of claim 1, wherein the fluid impermeable material is Nomex.

7. A method for damping vibrations within a physical object, said method comprising the steps of:
providing a flexible enclosure made from two bonded sheets, each made from a fluid-impermeable material, the flexible enclosure having a center seam separating respective first and second sides of the enclosure, each of the first and second sides of the flexible enclosure having at least one interior cavity that is substantially and loosely filled with a damping material produced in particle form, each interior cavity being bounded by an outer edge of the enclosure, the center seam and the two bonded sheets;
wrapping said flexible enclosure in overlaying relation over a portion of said physical object; and
securing said flexible enclosure to said physical object, wherein lateral outer edges on the first and second sides are secured to one another following wrapping of said enclosure about the physical object.

8. The method of claim 7, wherein each of said lateral outer edges includes a plurality of engagement members used for securing said flexible enclosure once wrapped about the physical object.

9. The method of claim 7, each side of the flexible enclosure having a pair of interior cavities and an intermediate cavity disposed between the pair of interior cavities and in which the intermediate cavity is not filled with the damping material.

10. The method of claim 7, in which the fluid-impermeable material of the flexible enclosure is Nomex.

11. An apparatus for damping vibrations within a physical object, said apparatus comprising:
a flexible enclosure comprising a pair of bonded sheets made from a fluid impermeable material, the flexible enclosure being defined by a center seam separating first and second sides of the flexible enclosure, each side of the enclosure including at least one interior cavity substantially and loosely filled with a damping material produced in particle form, said enclosure having a first outer edge and a second outer edge on the first and second sides, each interior cavity of the enclosure being defined by one of the outer edges, the center seam and an interior surface of the pair of bonded sheets, said first and second outer edges having a plurality of engagement members disposed in spaced relation that enable said flexible enclosure to be secured in overlaying relation relative to said physical object when wrapped thereabout.

12. The apparatus of claim 11, in which said engagement members comprise hooks having C-shaped engagement portions that are reflexed inwardly toward a center axis of said flexible enclosure when wrapped about the physical object, said engagement members being configured to receive lacing that is used to wind about said C-shaped engagement portions between said outer edges for tightening and securing the flexible enclosure to the physical object.

13. The apparatus of claim 11, wherein said damping material is granulated.

14. The apparatus of claim 11, wherein said damping material is a granulated elastomer.

15. The apparatus of claim 11, each side of the flexible enclosure having a pair of interior cavities and an intermediate cavity disposed between the pair of interior cavities and in which the intermediate cavity is not filled with the damping material.

16. The apparatus of claim 11, in which the fluid impermeable material is Nomex.

* * * * *